Figure 1:
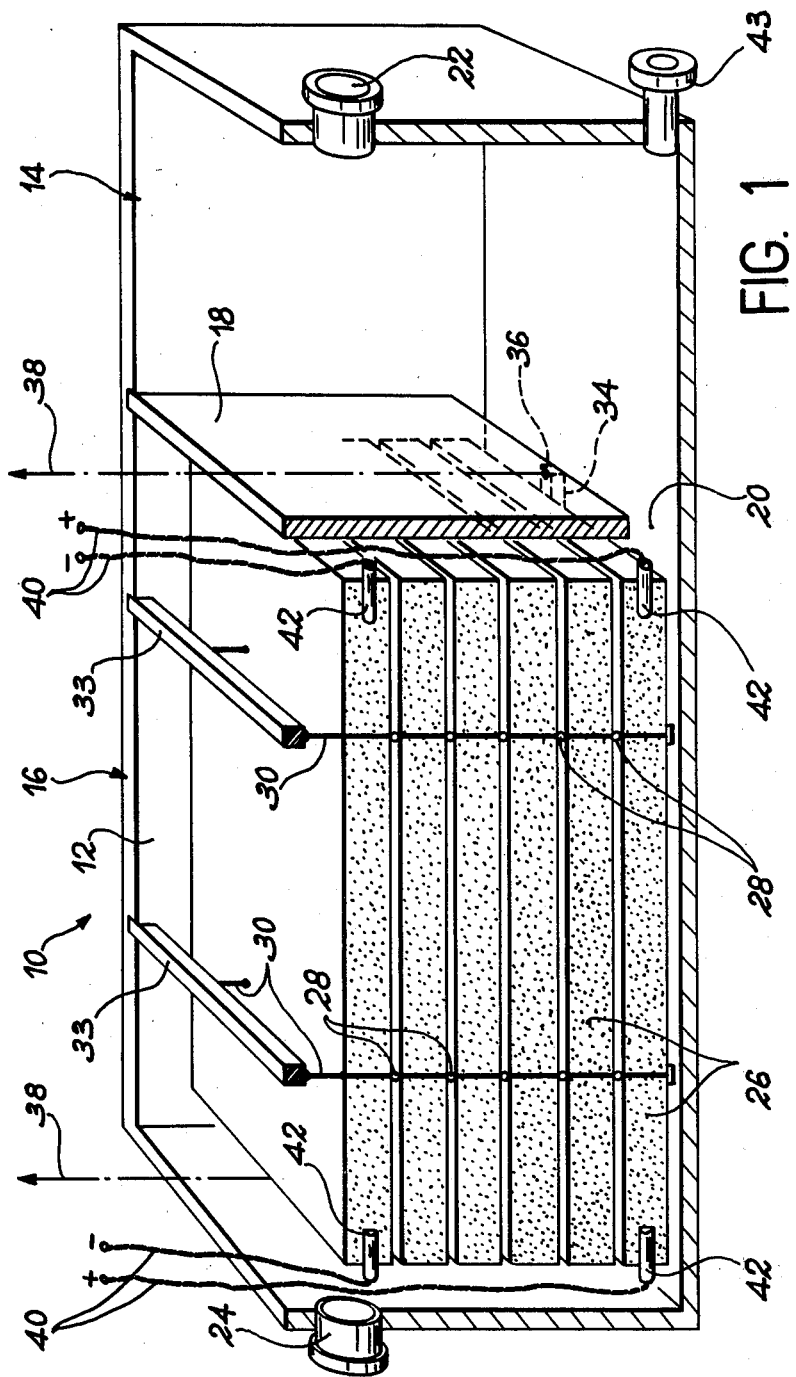

United States Patent [19]

Cohen

[11] 4,288,309

[45] Sep. 8, 1981

[54] ELECTROLYTIC DEVICE

[75] Inventor: Samuel Cohen, Paris, France

[73] Assignee: Ecopol, Paris, France

[21] Appl. No.: 104,688

[22] Filed: Dec. 17, 1979

[30] Foreign Application Priority Data

Dec. 20, 1978 [FR] France .............................. 78 35830

[51] Int. Cl.³ .............. ........ C25B 9/02; C25B 11/02; C25B 15/04
[52] U.S. Cl. ................................ 204/225; 204/268; 204/269; 204/275; 204/279; 204/286
[58] Field of Search .............................. 204/267–270, 204/275–278, 225, 286, 279, 249, 95

[56] References Cited

U.S. PATENT DOCUMENTS

| | | | |
|---|---|---|---|
| 514,275 | 2/1894 | Randolph | 204/268 X |
| 566,673 | 8/1896 | Fielding et al. | 204/268 |
| 831,434 | 9/1906 | Hinkson | 204/268 |
| 2,069,206 | 2/1937 | Axtell | 204/268 X |
| 3,554,893 | 1/1971 | De Varda | 204/225 X |
| 3,682,809 | 8/1972 | Marquardson et al. | 204/275 |
| 4,048,047 | 9/1977 | Beck et al. | 204/269 X |
| 4,188,278 | 2/1980 | Reis et al. | 204/268 |

FOREIGN PATENT DOCUMENTS 2502840  7/1976  Fed. Rep. of Germany ...... 204/268

Primary Examiner—Donald R. Valentine
Attorney, Agent, or Firm—Kerkam, Stowell, Kondracki & Clarke

[57] ABSTRACT

The device comprises a tank filled with electrolyte, flat electrodes which are stacked horizontally so as to rest upon one another under the action of gravity and at least a certain number of which are consumable. Two successive electrodes are separated by spacer elements having the same thickness and formed of material which is inert to electrolysis. The contact surfaces between the spacer elements and the electrodes therefore permit substantially uniform erosion of the consumable electrodes over their entire surface and the spacing between two consecutive electrodes thus remains constant.

20 Claims, 3 Drawing Figures

U.S. Patent    Sep. 8, 1981    Sheet 2 of 2    4,288,309

ELECTROLYTIC DEVICE

This invention relates to an electrolytic device and in particular to an electrolytic device in which a certain number of electrodes are consumable.

The majority of known electrolytic devices comprise a tank filled with electrolyte in which are immersed electrodes constituted by a stack of flat and parallel plates placed vertically and at a predetermined distance from each other, said plates being usually connected to electrical connection rods located in the upper portion of the tank.

When the electrodes or only a certain number of electrodes are formed of consumable material such as graphite or copper, the interelectrode space tends to increase progressively during use of the electrolytic device. When devices of this type are intended to be employed in applications calling for input power and power consumption efficiency which are as constant as possible, it is therefore necessary to replace the electrodes at very frequent intervals.

In order to overcome this disadvantage, one known practice consists of employing electrodes of materials which are consumable only at a very low rate. This solution, however, imposes a severe limitation on the range of materials open to choice and cannot be adopted in all cases, especially when it involves the construction of electrolytic devices having operating characteristics which fall short of requirements.

The aim of the invention is to provide an electrolytic device in which at least a certain number of electrodes are consumable and in which the spacing between two consecutive electrodes nevertheless remains constant irrespective of the degree of erosion of the consumable electrodes.

The electrolytic device according to the invention essentially comprises a tank filled with electrolyte, flat electrodes which are stacked horizontally so as to rest upon one another under the action of gravity and at least a certain number of which are consumable. Two successive electrodes are separated by spacer elements having the same thickness and formed of material which is inert to electrolysis, with the result that the contact surfaces between the spacer elements and the electrodes permit substantially uniform erosion of the consumable electrodes over their entire surface and the spacing between two consecutive electrodes thus remains constant.

In a particular embodiment of the invention, the spacer elements are constituted by balls having the same diameter, two consecutive electrodes being separated by at least three non-aligned balls. In this embodiment, the balls can be threaded on vertical wires of material which is inert to electrolysis. Said wires pass through holes pierced in the electrodes, the diameter of the holes being substantially smaller than that of the balls. Preferably, the vertical wires are accordingly attached to horizontal bars associated with the top portion of the tank.

Figure 3:
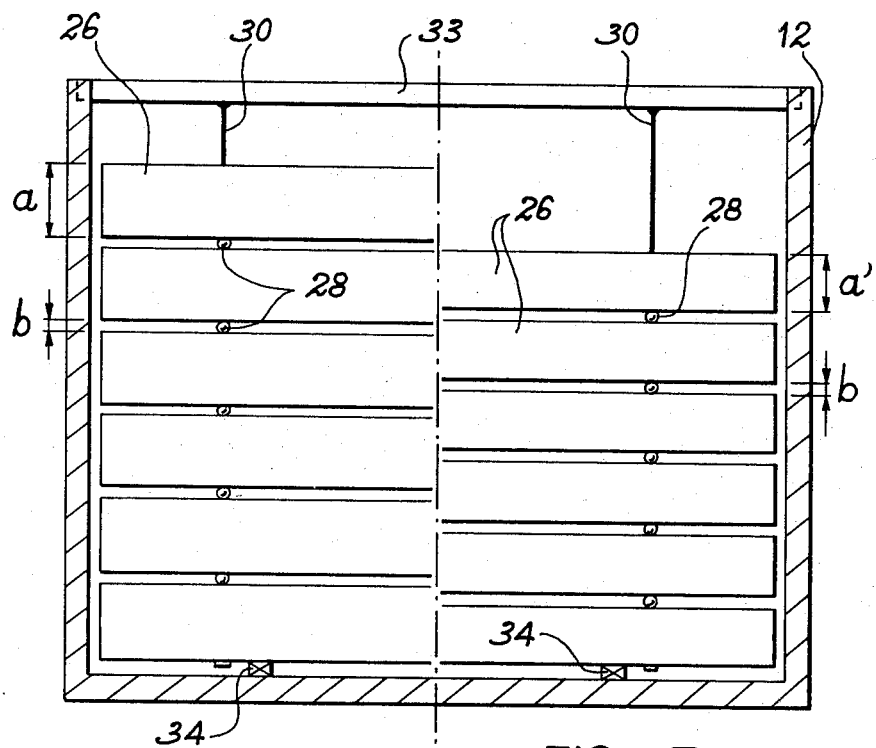

According to a secondary distinctive feature of the invention, the electrodes rest directly on a detachable member of material which is inert to electrolysis. Hooks can be provided at the ends of said detachable member so as to permit withdrawal of the complete array of electrodes balls employed as spacer elements between said electrodes and the method adopted for mounting said balls;

FIG. 3 is a transverse sectional view of the electrolytic device shown in FIG. 1, in which the left half of the figure represents the state of the device when the electrodes are new and in which the right half represents the same device when the electrodes are spent.

The electrolytic device illustrated in FIG. 1 and generally designated by the reference 10 comprises a tank 12 of material which is inert to electrolysis such as plastic material, for example. In the embodiment which is illustrated, the tank is constituted by two compartments 14 and 16 which are separated by a partition 18 and communicate with each other through a passage 20 defined between the lower end of the partition 18 and the bottom of the tank 12. The first compartment 14 is provided with an inlet 22 which is located near the top edge of the wall opposite to the partition 18. The compartment 16 is provided with an outlet 24 near the top edge of the wall opposite to said partition 18. A structure of this type is particularly well suited to electrolysis of liquid solutions such as sea water, for example. Whereas the first compartment 14 which is of small size serves to regulate the flow of solution to be processed, the actual electrolysis takes place within the second compartment 16 which is of substantially larger size. In said compartment 16, the solution to be processed is admitted through the passage 20 formed beneath the partition 18 between the compartments 14 and 16. Emptying of the compartments takes place at the end of the operation by means of a drain outlet 43.

The electrolytic compartment 16 proper contains a predetermined number of flat electrodes 26 which are stacked one above the other and disposed horizontally. At least a certain number of electrodes 26 are formed of consumable material such as graphite. As shown in greater detail in FIG. 2, two successive electrodes 26 are separated by spacer elements having the same thickness and consisting of balls 28 having the same diameter in the embodiment which is illustrated. The balls 28 are formed of material which is inert to electrolysis such as glass or plastic and are threaded on vertical wires 30. Said wires are also formed of material which is inert to electrolysis and attached at their upper ends to two horizontal cross-bars 33 which are rigidly fixed to the walls of the tank 12 at the level of the top edge of said walls as shown in FIG. 1. The wires 30 pass through cylindrical holes 32 which are drilled in the electrodes 26 and the diameter of which is very appreciably smaller than that of the balls 28.

By virtue of this arrangement, the electrodes 26 rest upon one another under the action of gravity by means of the balls 28, with the result that the spacing between the electrodes remains constant irrespective of the thickness of these latter.

Preferably, and in order to permit replacement of electrodes when these latter are spent, a detachable element (not shown) designed in the form of a plate, for example, and made of material which is inert to electrolysis such as glass or plastic, for example, is placed in the bottom of the compartment 16 of the tank 12 beneath the stack of electrodes 26. This detachable plate is provided with lugs 34 which project from the ends of the electrodes towards the partition 18 and towards the opposite wall of the electrolytic compartment 16. The lugs 34 are adapted to carry hooks or any other similar device shown diagrammatically at 36 for lifting the stack of electrodes 26 and the detachable plate in the direction of the arrows in FIG. 1 by any suitable lifting means such as chains or cables of material which is inert to electrolysis, said means being shown diagrammatically in chain-dotted lines and designated by the reference numeral 38.

As shown especially in FIG. 1, the electrodes 26 are of parallelepipedal shape and have a smaller horizontal cross-sectional area than the electrolytic compartment 16 of the tank 12 so as to define with the partition 18 and with the opposite wall of the compartment 16 two spaces for passing cables or chains 38 as well as electric supply leads 40. Said leads are connected at one end to the top and bottom electrodes 26 by means of inserts 42 and at the other end to a direct-current voltage source (not shown in the drawings). In fact, in the embodiment which is illustrated, electric current is supplied only to the end electrodes whilst the remaining electrodes are supplied in series.

In the embodiment shown in the drawings and especially in FIG. 1, provision is made for two horizontal cross-bars 33 which extend transversely with respect to the electrodes. Each cross-bar is adapted to support four wires 30 along which the electrodes 26 and the balls 28 are threaded in alternate sequence. The wires 30 terminate beneath the bottom electrode in widened-out bearing elements 44 which serve to maintain the tension of the wires.

Figure 2:
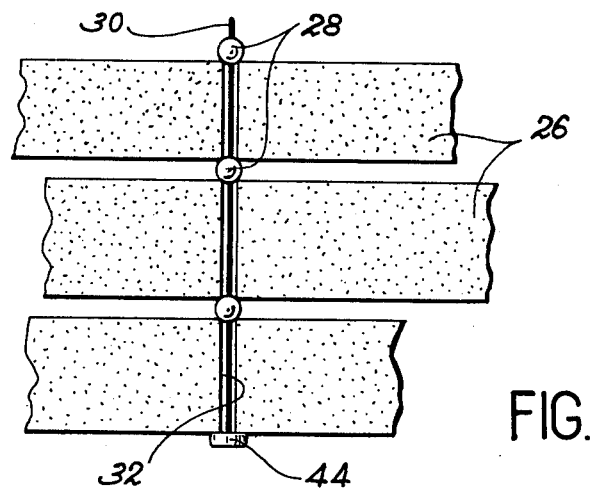

The operation of the electrolytic device described with reference to FIGS. 1 and 2 is as follows:

As shown in the left-hand portion of FIG. 3, when the electrodes 26 are new, they each have a thickness a and are disposed in spaced relation by means of balls 28 at a distance b. When the electrodes are connected electrically to a direct-current voltage source by means of supply leads 40 and when the solution to be processed circulates within the compartment 14 between the inlet 22 and the outlet 24, said solution being intended to flow successively through the compartment 14, the passage 20 and the compartment 16, electrolysis of the solution takes place in known manner and causes erosion of the consumable electrodes which constitute at least part of the electrodes 26. By making provision for the first compartment 14 and for the passage 20 formed beneath the partition 18, the supply of electrolyte constituted by the solution to be processed is carried out in a direction parallel to the surfaces opposite to the different electrodes, thus resulting in uniform erosion of these latter. The electrodes 26 rest upon one another under the action of gravity by means of balls 28 which have the same diameter and are formed of material which is inert to electrolysis. As illustrated in the right-hand portion of FIG. 3, the height of the complete assembly consequently decreases gradually by reason of the new thickness a' of each electrode whereas the interelectrode distance b remains the same. The power input and the power consumption efficiency of the electrolytic device according to the invention can thus be maintained constant irrespective of the state of erosion of the electrodes 26.

When erosion of the electrodes 26 is considered to be excessive, said electrodes can readily be replaced by withdrawing the complete electrode array by means of cables or chains 38. Since the horizontal cross-bars 33 simply rest in notches formed in the walls of the compartment 16, they can be disassembled at the same time. A new set of electrodes can then be placed in position after pre-assembly of said electrodes with balls 28 which have been interposed and threaded on the wires 30.

Although the electrolytic device described in the foregoing is particularly well suited to electrolysis of sea water, it will be understood that the invention is not limited to this particular application and can be employed in any other type of electrolysis in which consumable electrodes are employed at least to a partial extent.

Furthermore, the invention is not limited to the embodiment which has just been described by way of example but extends to all alternative forms. From this it accordingly follows that the spacer elements in the form of balls 28 can be replaced by spacer elements of any other shape such that the surface which is in contact with the electrodes is practically a point surface or a linear surface while providing sufficient mechanical strength to support the stack of electrodes which rest on said elements under the action of gravity and also having a shape which interferes as little as possible with the propagation of electric current within the electrolyte. By way of example, the spherical spacer elements described in the foregoing can be replaced by elements designed in the form of cylindrical rods or in the form of rods having an elliptical cross-section in which the ends of the minor axis of the ellipse are placed in contact with the electrodes.

We claim:

1. An electrolytic device, wherein said device comprises a tank adapted to contain electrolyte, flat electrodes which are stacked horizontally so as to rest one upon another under the action of gravity and at least a certain number of which are consumable, two successive electrodes being separated by spacer elements having the same thickness and formed of material which is inert to electrolysis so that the contact surfaces between the spacer elements and the electrodes permit substantially uniform erosion of the consumable electrodes over their entire surface and the spacing between two consecutive electrodes thus remains constant.

2. A device according to claim 1, wherein the electrodes rest directly on a detachable member of material which is inert to electrolysis.

3. A device according to claim 2, wherein hooks are provided at the ends of the detachable member so as to permit withdrawal of the complete array of electrodes from the tank.

4. A device according to claim 1, wherein the electrodes are of parallelepipedal shape.

5. A device according to claim 4, wherein horizontal cross-bars extend transversely with respect to the electrodes.

6. A device according to claim 1, wherein the tank is of larger horizontal cross-sectional area than the electrodes in order to permit free introduction of electric supply leads and withdrawal of spent electrodes and to obtain a uniform flow of electrolyte.

7. A device according to claim 1, wherein the tank comprises two compartments which are separated by a partition and communicate with each other through at least one passageway provided at the lower end of the partition, an inlet orifice which opens into the first compartment and an outlet orifice which opens into the second compartment, the inlet and outlet orifices being formed above the electrodes, said electrodes being placed within the second compartment.

8. An electrolytic device, wherein said device comprises a tank adapted to contain electrolyte, flat electrodes which are stacked horizontally so as to rest one upon another under the action of gravity and at least a certain number of which are consumable, two successive electrodes being separated by spacer elements having the same thickness and formed of material which is inert to electrolysis so that the contact surfaces between the spacer elements and the electrodes permit substantially uniform erosion of the consumable electrodes over their entire surface and the spacing between two consecutive electrodes thus remains constant and wherein the spacer elements are constituted by balls having the same diameter, two consecutive electrodes being separated by at least three non-aligned balls.

9. A device according to claim 8, wherein the balls are threaded on vertical wires of material which is inert to electrolysis, said wires being passed through holes pierced in the electrodes, the diameter of said holes being substantially smaller than the diameter of said balls.

10. A device according to claim 9, wherein the vertical wires are attached to horizontal cross-bars associated with the top portion of the tank.

11. An electrolytic device comprising a tank adapted to contain electrolyte, flat electrodes which are stacked horizontally and rest one upon another under the action of gravity, so as to define a top electrode and a lower electrode adapted to be connected to an external source of current, at least one of said electrodes being consumable, all of said electrodes being separated by spacer elements having the same thickness and formed of material which is insert to electrolysis, wherein each spacer element has a shape such that the contact surfaces between this spacer element and the corresponding electrodes permit substantially uniform erosion of the consumable electrode over their entire surface, whereby the thickness of the bed of electrolyte between two consecutive electrodes remains constant.

12. A device according to claim 11, wherein the spacer elements are constituted by balls having the same diameter, two consecutive electrodes being separated by at least three non-aligned balls.

13. A device according to claim 12, wherein the balls are threaded on vertical wires of material which is inert to electrolysis, said wires being passed through holes pierced in the electrodes, the diameter of said holes being substantially smaller than the diameter of said balls.

14. A device according to claim 13, wherein the vertical wires are attached to horizontal cross-bars associated with the top portion of the tank.

15. A device according to claim 11, wherein the electrodes rest directly on a detachable member of material which is inert to electrolysis.

16. A device according to claim 15, wherein hooks are provided at the end of the detachable member so as to permit withdrawal of the complete array of electrodes from the tank.

17. A device according to claim 11, wherein the tank is of larger horizontal cross-sectional area than the electrodes in order to permit free introduction of electric supply leads and withdrawal of spent electrodes and to obtain a uniform flow of electrolyte.

18. A device according to claim 11, wherein the tank comprises two compartments which are separated by a partition and communicate with each other through at least one passageway provided at the lower end of the partition, an inlet orifice which opens into the first compartment and an outlet orifice which opens into the second compartment, the inlet and outlet orifices being formed above the electrodes, said electrodes being placed within the second compartment.

19. An electrolytic device comprising a tank adapted to contain an electrolyte, flat electrodes which are stacked horizontally and rest one upon another under the action of gravity, so as to define a top electrode and a lower electrode adapted to be connected to an external source of current, at least one of said electrodes being consumable, all of said electrodes being separated by spacer elements having the same thickness and formed of material which is inert to electrolysis, wherein the spacer elements are constituted by balls having the same diameter, two successive electrodes being separated by at least three non-aligned balls, the contact surfaces between said balls and the corresponding electrodes permitting substantially uniform erosion of the consumable electrode over their entire surface, whereby the thickness of the electrolyte defining the spacing between two consecutive electrodes remains constant.

20. A device according to claim 19, wherein the lower electrode rests on a detachable member of a material which is inert to electrolysis, said detachable member being provided with hooks permitting withdrawal of all the electrodes from the tank.

* * * * *